(12) United States Patent
Newcomb et al.

(10) Patent No.: US 11,926,130 B1
(45) Date of Patent: Mar. 12, 2024

(54) FIBER REINFORCED THERMOPLASTIC COMPOSITE BODY PANEL

(71) Applicant: GM GLOBAL TECHNOLOGY OPERATIONS LLC, Detroit, MI (US)

(72) Inventors: Bradley Allen Newcomb, Troy, MI (US); Thomas S. Prevost, West Bloomfield, MI (US); Bhavesh Shah, Troy, MI (US); Julien P Mourou, Bloomfield Hills, MI (US); Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/899,127

(22) Filed: Aug. 30, 2022

(51) Int. Cl.
   *B32B 3/10* (2006.01)
   *B29C 70/16* (2006.01)
   *B29C 70/20* (2006.01)
   *B32B 3/30* (2006.01)
   *B32B 5/06* (2006.01)
   (Continued)

(52) U.S. Cl.
   CPC .............. *B32B 3/10* (2013.01); *B29C 70/16* (2013.01); *B29C 70/20* (2013.01); *B32B 3/30* (2013.01); *B32B 5/06* (2013.01); *B32B 5/12* (2013.01); *B32B 7/09* (2019.01); *B32B 9/047* (2013.01); *B32B 27/06* (2013.01); *B32B 37/15* (2013.01); *B32B 38/00* (2013.01); *B32B 2038/008* (2013.01); *B32B 2255/10* (2013.01); *B32B 2260/021* (2013.01); *B32B 2260/046* (2013.01); *B32B 2262/02* (2013.01); *B32B 2262/10* (2013.01); *B32B 2262/101* (2013.01); *B32B 2262/106* (2013.01); *B32B 2305/10* (2013.01); *B32B 2307/54* (2013.01); *B32B 2307/72* (2013.01); *B32B 2307/732* (2013.01); *B32B 2313/04* (2013.01); *B32B 2315/08* (2013.01); *B32B 2318/00* (2013.01)

(58) Field of Classification Search
   CPC .. B32B 3/10; B32B 3/30; B32B 27/06; B32B 2038/008; B32B 2262/02; B32B 2255/10; B32B 2260/021; B32B 2260/046; B32B 2262/10; B32B 2262/101; B32B 2262/106; B32B 5/06; B32B 5/073; B32B 7/09; B32B 9/047; B32B 37/15; D04H 3/10; D04H 3/102; D04H 1/74; B29B 11/16; Y10T 428/24033; B29C 70/16; B29C 70/20; D04B 21/165; B62D 29/04; B62D 29/043; B62D 25/06
   USPC ...................... 428/299.1, 299.4, 297.4, 298.1
   See application file for complete search history.

(56) References Cited

U.S. PATENT DOCUMENTS

| 11,267,514 B2 | 3/2022 | Aitharaju et al. |
| 11,358,647 B1 | 6/2022 | Newcomb et al. |
| 11,383,771 B1 | 7/2022 | Newcomb et al. |

FOREIGN PATENT DOCUMENTS

RU        165528 U1 * 10/2016 ............... B32B 5/10

OTHER PUBLICATIONS

Translation of RU165528U1. (Year: 2016).*
(Continued)

*Primary Examiner* — Catherine A. Simone

(57) ABSTRACT

A composite panel includes a backing substrate and a first plurality of fiber tows. The first plurality of fiber tows is stitched to a first surface of the backing substrate in a predetermined pattern to form a fiber reinforced insert. A first polymer layer encapsulates the first surface of the backing substrate and the first plurality of fiber tows.

19 Claims, 8 Drawing Sheets

(51) Int. Cl.
*B32B 5/12* (2006.01)
*B32B 7/09* (2019.01)
*B32B 9/04* (2006.01)
*B32B 27/06* (2006.01)
*B32B 37/15* (2006.01)
*B32B 38/00* (2006.01)

(56) References Cited

OTHER PUBLICATIONS

Bradley Allen Newcomb et al., U.S. Appl. No. 17/584,557, filed Jan. 26, 2022, entitled "Temperature Compensated, Fiber Reinforced, Structural Composite Roof", 38 pages.

Bradley Allen Newcomb et al., U.S. Appl. No. 17/667,260, filed Feb. 8, 2022, entitled "Heated Vehicle Header", 82 pages.

Bradley Allen Newcomb et al., U.S. Appl. No. 17/699,696, filed Mar. 21, 2022, entitled "Transparent Structural Composites with Encapsulated Micro-LEDs", 35 pages.

Bradely Allen Newcomb et al., U.S. Appl. No. 17/825,041, filed May 26, 2022, entitled "Structural Panoramic Windshield and Roof", 32 pages.

Bradley A. Newcomb et al., U.S. Appl. No. 17/406,024, filed Aug. 18, 2021, entitled "Transport Composite for a Vehicle Roof", 53 pages.

Bradley A. Newcomb et al., U.S. Appl. No. 17/406,023, filed Aug. 18, 2021, entitled "Transparent Composite for a Vehicle Header", 55 pages.

Bradley Allen Newcomb et al.; U.S. Appl. No. 17/845,333, filed Jun. 21, 2022, entitled "Painted Components and Painted Composite Components with Micro-LEDS", 32 pages.

Bradley A. Newcomb et al.; U.S. Appl. No. 17/141,478, filed Jan. 5, 2021; entitled "Laminate Composite Roof Panels with Internal Localized Structural Reinforcements for Motor Vehicles"; 40 pages.

Bradley A. Newcomb et al.; U.S. Appl. No. 17/152,965, filed Jan. 20, 2021; entitled "Fiber-Reinforced Polymer Composite Components for Vehicle Body Structures and Methods of Making the Same"; 27 pages.

Bradley A. Newcomb et al.; U.S. Appl. No. 17/141,524, filed Jan. 5, 2021; entitled "Transparent Composite Body Panels with Localized Structural Reinforcements for Motor Vehicles"; 40 pages.

"Transparent Composite Body Panels with Localized Structural Reinforcements for Motor Vehicles"; 40 pages.

\* cited by examiner

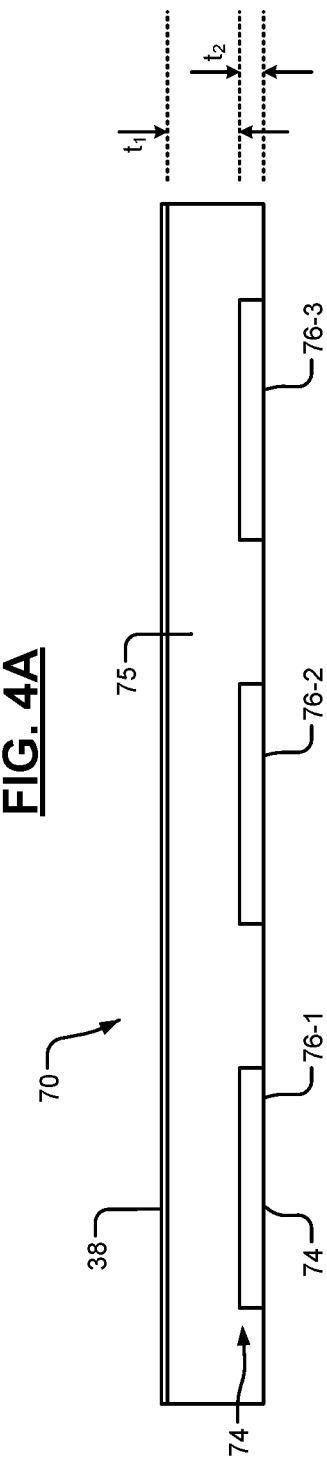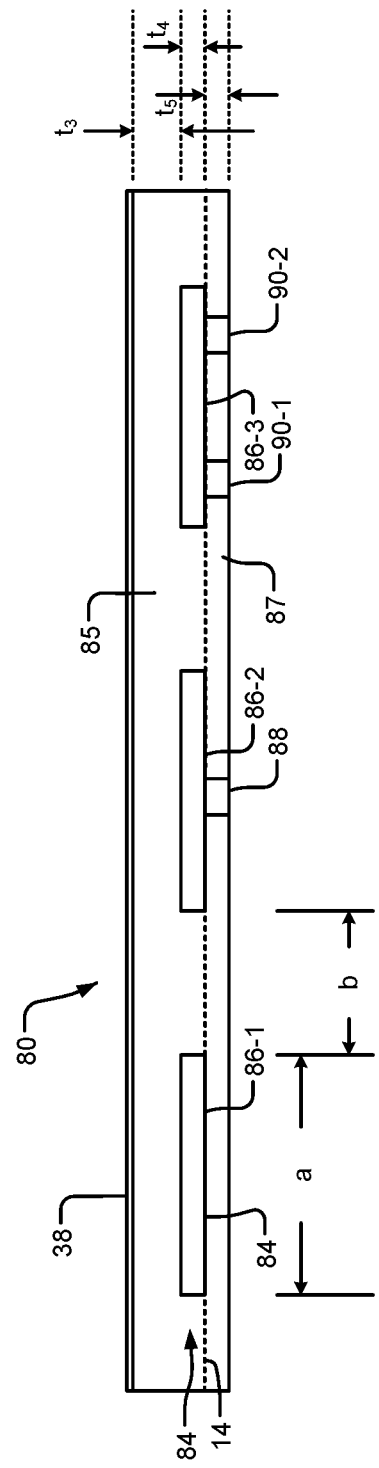

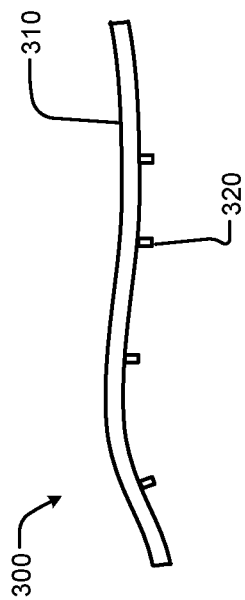
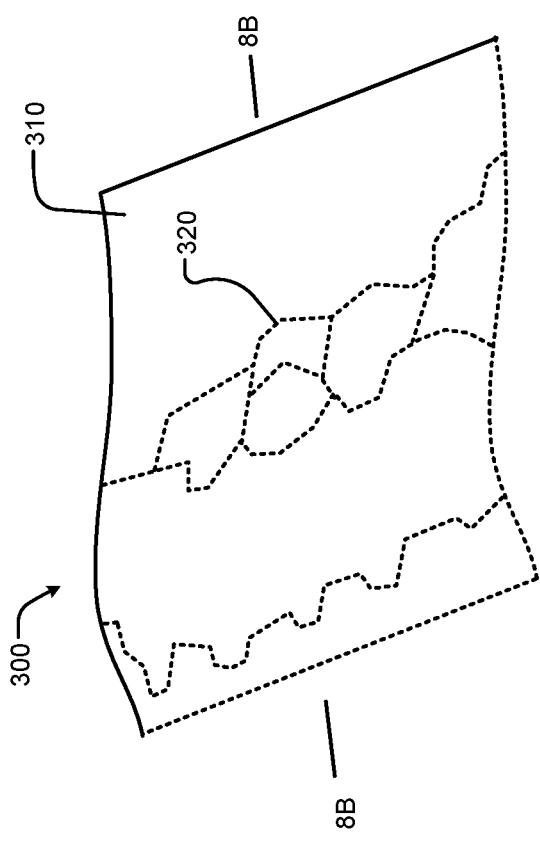
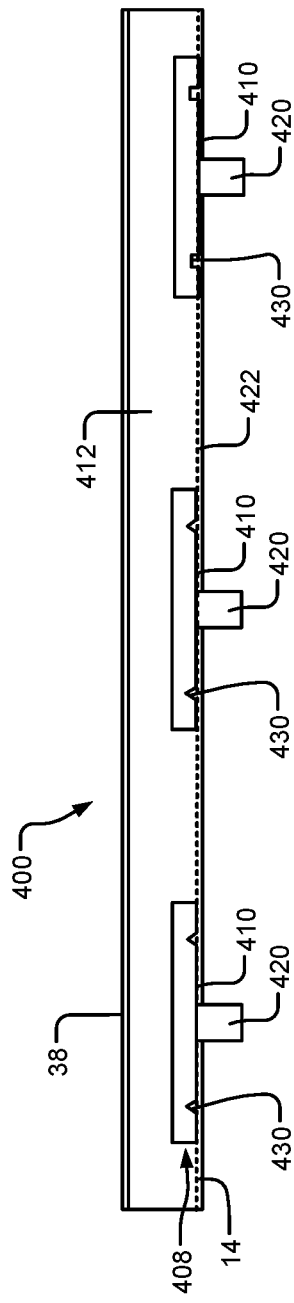

FIBER REINFORCED THERMOPLASTIC COMPOSITE BODY PANEL

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to composite body panels for vehicles, and more particularly to fiber reinforced thermoplastic composite body panels.

Vehicles include structural components such as battery covers, hoods, decklids, doors, fenders, liftgates and other structural components. For example, a battery cover may be used to cover a battery system including one or more battery cells. To reduce the weight of the vehicle, some components can be made using composite materials such as carbon fiber.

SUMMARY

A composite panel includes a backing substrate and a first plurality of fiber tows. The first plurality of fiber tows is stitched to a first surface of the backing substrate in a predetermined pattern to form a fiber reinforced insert. A first polymer layer encapsulates the first surface of the backing substrate and the first plurality of fiber tows.

In other features, a paint layer or a film layer is arranged on the first polymer layer. The first plurality of fiber tows includes commingled fibers including first continuous fibers selected from a group consisting of carbon fibers, glass fibers, basalt fibers, and combinations thereof and second continuous fibers including thermoplastic fibers.

In other features, the first plurality of fiber tows includes continuous fibers selected from a group consisting of carbon fibers, glass fibers, basalt fibers, and combinations thereof.

In other features, fibers of the first plurality of fiber tows are infused with a thermoset resin.

In other features, the composite panel is consolidated using at least one of heat and pressure prior to encapsulating the first surface of the backing substrate and the first plurality of fiber tows in the first polymer layer.

In other features, the first polymer layer is selected from a group consisting of polycarbonate, polypropylene, polycarbonate/acrylonitrile-butadiene-styrene (PC/ABS), polyphenylene oxide/polyamide (PPO/PA), polycarbonate/acrylonitrile-butadiene-styrene/polymethyl methacrylate (PC/ABS/PMMA), polyurethane, poly(aryl-ether-ketone) (PAEK), poly(ether-ketone) (PEK), poly(ether-ether-ketone) (PEEK), polyamides (PA), polyphenylene sulfide (PPS), epoxy, thermoplastic polyolefins (TPO), mineral filled resin, fiber filled resin, and combinations thereof.

In other features, a second plurality of fiber tows stitched to a second surface of the backing substrate in a second predetermined pattern to form one or more ribs.

In other features, a second polymer layer encapsulating the second surface of the backing substrate and some or all of the one or more ribs. The first plurality of fiber tows define one or more interlocking portions adjacent to the backing substrate.

In other features, a density the composite panel is less than 1.20 g/cc, a tensile modulus is greater than 5000 MPa in at least one direction, a coefficient of linear thermal expansion (CLTE) in at least one direction is less than 30 ppm/° C., a tensile strength in at least one direction is greater than or equal to 50 MPa, and a thickness of the composite panel is between 2 mm and 6 mm.

A method for manufacturing a composite panel includes providing a backing substrate; stitching a first plurality of fiber tows to a first surface of the backing substrate in a predetermined pattern to form a fiber reinforced insert; and encapsulating the first surface of the backing substrate and the first plurality of fiber tows in a first polymer layer.

In other features, the first plurality of fiber tows includes continuous fibers.

In other features, the first plurality of fiber tows include first continuous fibers selected from a group consisting of carbon fibers, glass fibers, basalt fibers, and combinations thereof, and second continuous fibers including thermoplastic fibers.

In other features, fibers of the first plurality of fiber tows include continuous fibers selected from a group consisting of carbon fibers, glass fibers, basalt fibers, and combinations thereof. The fibers of the first plurality of fiber tows are infused with a thermoset resin.

In other features, the method includes consolidating the composite panel using at least one of heat and pressure prior to encapsulating the first surface of the backing substrate and the first plurality of fiber tows in the first polymer layer.

In other features, the first polymer layer is selected from a group consisting of polycarbonate, polypropylene, polycarbonate/acrylonitrile-butadiene-styrene (PC/ABS), polyphenylene oxide/polyamide (PPO/PA), polycarbonate/acrylonitrile-butadiene-styrene/polymethyl methacrylate (PC/ABS/PMMA), polyurethane, poly(aryl-ether-ketone) (PAEK), poly(ether-ketone) (PEK), poly(ether-ether-ketone) (PEEK), polyamides (PA), polyphenylene sulfide (PPS), epoxy, thermoplastic polyolefins (TPO), mineral filled resin, fiber filled resin, and combinations thereof.

In other features, the method includes stitching a second plurality of fiber tows to a second surface of the backing substrate to form one or more ribs.

In other features, the method includes encapsulating the second surface of the backing substrate and the second plurality of fiber tows in a second polymer layer.

In other features, a density of the composite panel is less than 1.20 g/cc, a tensile modulus of the composite panel is greater than 5000 MPa in at least one direction, a coefficient of linear thermal expansion (CLTE) of the composite panel in at least one direction is less than 30 ppm/° C., a tensile strength of the composite panel in at least one direction is greater than or equal to 50 MPa, and a thickness of the composite panel is between 2 mm and 6 mm.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 4A and 4B are side cross-sectional views illustrating an example of a fiber reinforced thermoplastic composite body panel according to the present disclosure;

FIG. 8A is a perspective view of an example of fiber reinforced thermoplastic composite body panel including ribs according to the present disclosure;

FIG. 8B is a side cross-sectional view of an example of fiber reinforced thermoplastic composite body panel including ribs according to the present disclosure; and FIG. 9 is a side cross-sectional view of an example of fiber reinforced thermoplastic composite body panel including interlocking portions according to the present disclosure.

In the drawings, reference numbers may be reused to identify similar and/or identical elements.

DETAILED DESCRIPTION

While the present disclosure is directed to a fiber reinforced thermoplastic composite body panel for a vehicle, the fiber reinforced thermoplastic composite body panels can be used in non-vehicle applications.

The fiber reinforced polymer panel includes a backing substrate and a first plurality of fiber tows. The first plurality of fiber tows is stitched to a first surface of the backing substrate in a predetermined pattern and in one or more layers to form a fiber reinforced insert. A first polymer layer encapsulates the first surface of the backing substrate and the first plurality of fiber tows.

In some examples, the fiber reinforced polymer composite panel has a density less than 1.20 g/cc, a tensile modulus is greater than 5000 MPa in at least one direction, a coefficient of linear thermal expansion (CLTE) in at least one direction less than 30 ppm/° C., a tensile strength in at least one direction is greater than or equal to 50 MPa, and a thickness between 2 mm and 6 mm.

In some examples, the first plurality of fiber tows includes continuous fibers. In some examples, the first plurality of fiber tows is locally applied and includes at least one of carbon fibers, glass fibers, basalt fibers, or other fibers. In some examples, the fibers are commingled with thermoplastic fibers, consolidated into a structural insert, and encapsulated with a thermoplastic resin material. In some examples, the plurality of fibers tows and the backing substrate are consolidated under temperature and/or pressure prior to encapsulation.

In some examples, the first plurality of fiber tows is encapsulated as a central layer in the composite panel. In some examples, one side of the composite panel is painted or covered in a film. In some examples, the first plurality of fiber tows and/or the first polymer layer have a variable thickness.

In some examples, reinforcement provided by the fiber reinforced insert is anisotropic such that local stiffness, thermal expansion, strength, and other thermo-mechanical properties vary as a function of location within the composite panel.

In some examples, the first polymer layer is transparent such that light can transmit through portions of the composite panel. In some examples, the first polymer layer includes a resin that is short fiber filled, long fiber filled, mineral filled, or combinations thereof. Still other variations will be described further below.

Figure 1:
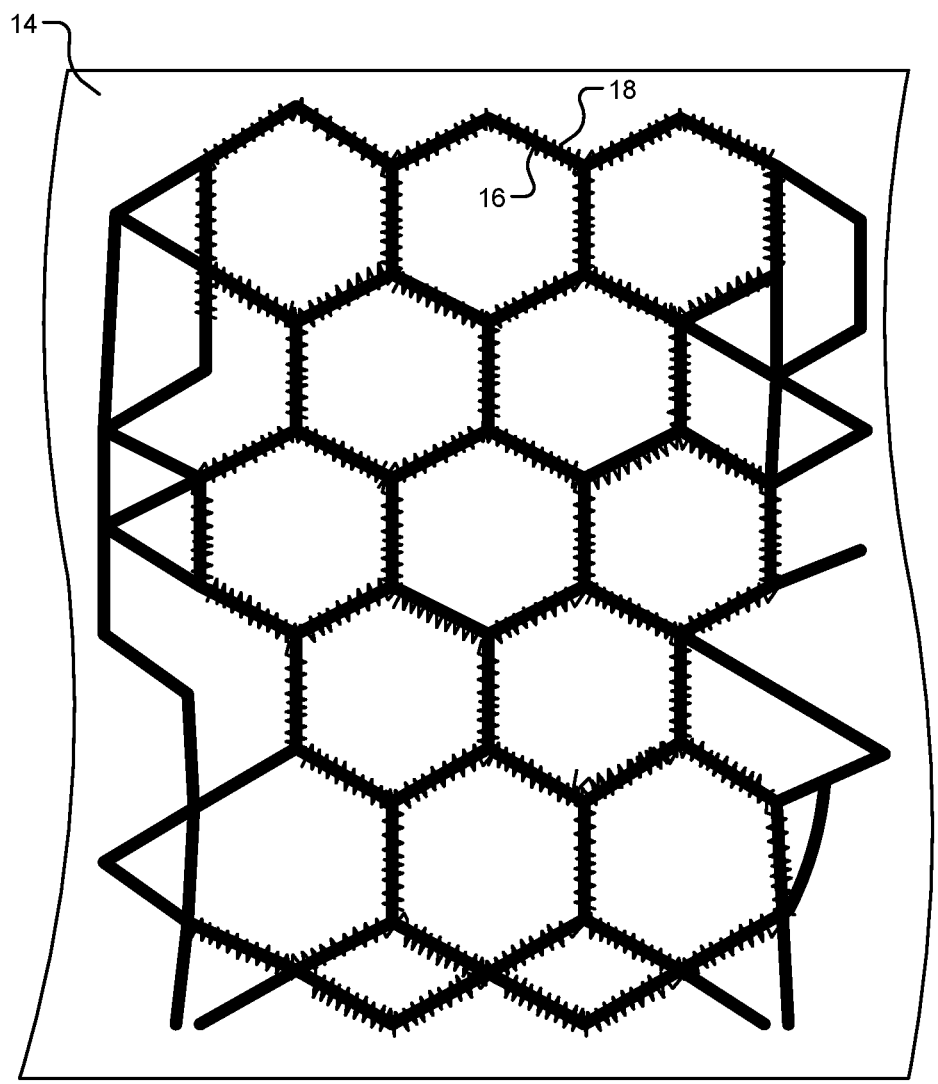
FIG. 1 is a plan view illustrating an example of fiber stitched to a backing substrate according to the present disclosure.

Referring now to FIG. 1, fiber tow 16 is stitched by stitches 18 to a backing substrate 14 in a predetermined pattern to create a fiber reinforced insert. In some examples, tailored fiber placement (TFP) is used to place and stitch the fiber tow 16 onto the backing substrate 14 in a predetermined pattern. In some examples, the backing substrate 14 is made of a polymer that is compatible with subsequent processing stages.

In some examples, the fiber tow 16 includes dry reinforcing fibers such as carbon, glass, basalt, and combinations thereof and/or thermoplastic fibers such as nylon. In other words, in some examples, fibers in the fiber tow 16 can be comingled in a fiber tow (e.g., carbon and glass, carbon and nylon, etc.).

In some examples, the fiber tow 16 are arranged to overlap other fiber tow 16. In some examples, the fiber tow 16 are arranged immediately adjacent to other fiber tow 16 on the backing substrate 14. As the fiber tow 16 are laid, the fiber tow 16 are stitched by stitches 18 to the backing substrate 14.

Figure 2A:
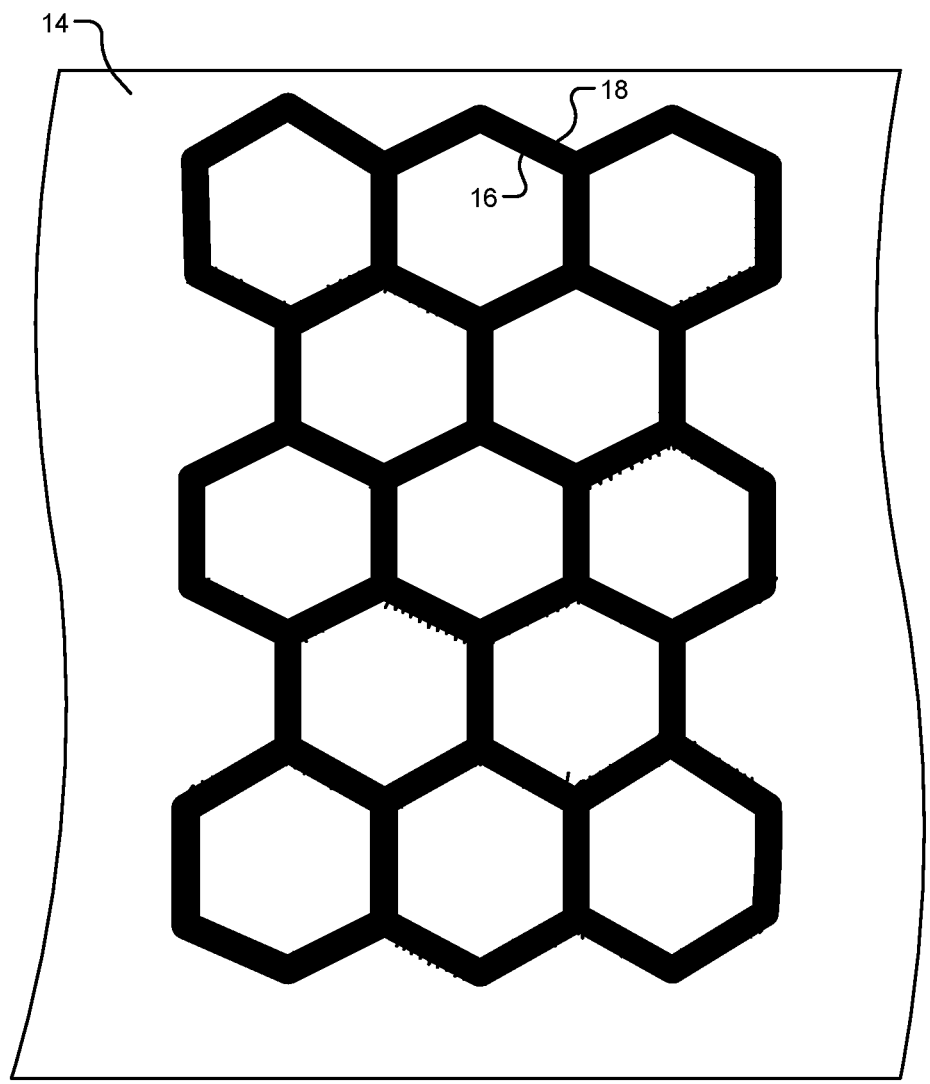
FIGS. 2A and 2B are plan views illustrating an example of fiber stitched to a backing substrate after consolidation according to the present disclosure.
Figure 2B:
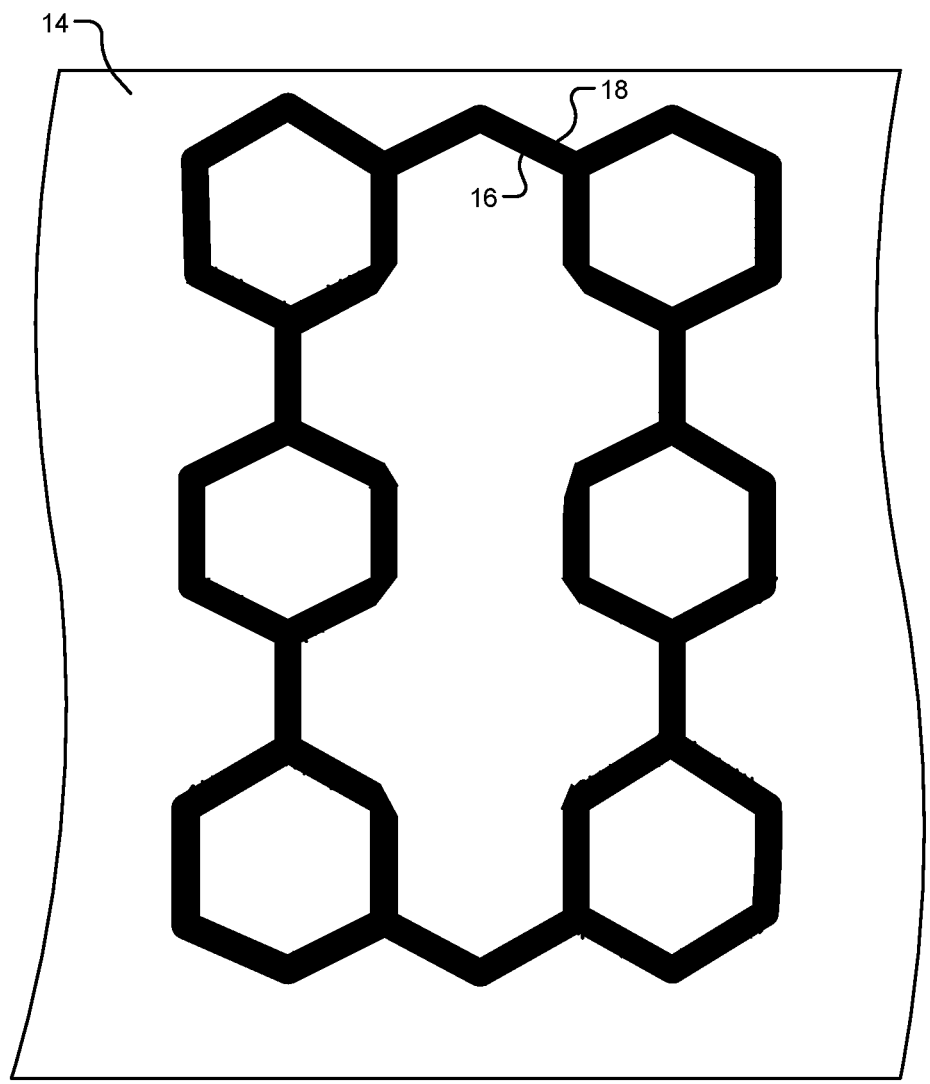

Referring now to FIGS. 2A and 2B, trimming of the fiber tow 16 and/or consolidation is performed. As can be seen, the fiber tow 16 is laid and stitched in a relatively continuous fashion. After laying the fiber tow 16, trimming of the fiber tow 16 may be performed to refine the shape into the predetermined pattern for the fiber reinforced insert. The examples in FIGS. 2A and 2B show different trimming operations performed after the fiber tow 16 is laid and stitched.

In some examples, consolidation is performed if the fiber tow includes comingled reinforcing fibers and thermoplastic fibers. In some examples, consolidation is performed by heating the backing substrate and fiber tow to a predetermined melting temperature of the thermoplastic resin and/or by increasing pressure on the backing substrate and fiber tow to a predetermined consolidation pressure.

Figure 3:
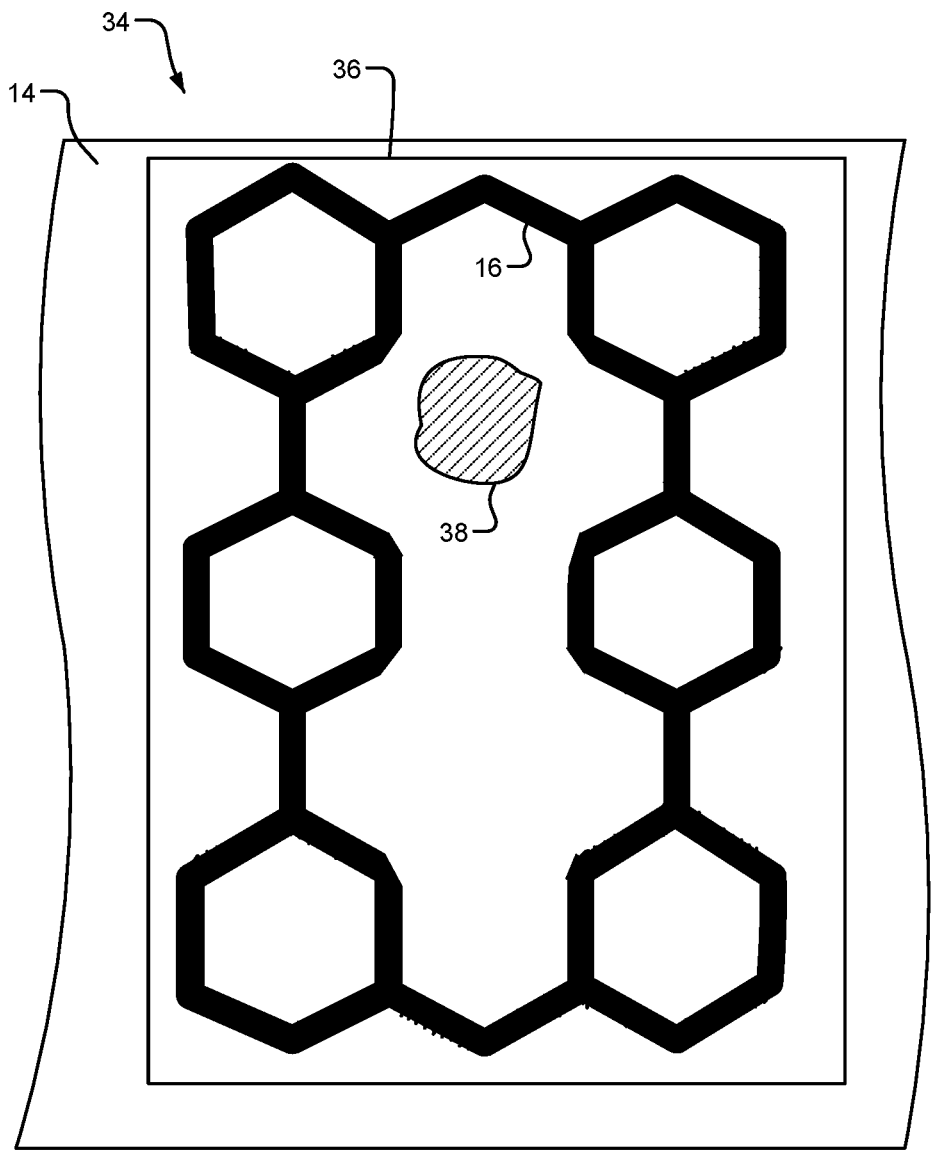
FIG. 3 is a plan view illustrating an example of fiber stitched to a backing substrate after encapsulation and painting according to the present disclosure.

Referring now to FIG. 3, after trimming and/or consolidation, the fiber tow, stitches and backing substrate are encapsulated in a first polymer layer to form a composite panel 34. In some examples, injection molding of thermoplastic resin is used for a consolidated insert. In other examples, a resin infusion process is used if using a thermoset resin. In some examples, the first polymer layer is transparent. In some examples, both sides of the backing substrate are encapsulated.

After encapsulation, one or more surfaces of the composite panel 34 are painted or a film is applied at 38. As can be appreciated, the backing substrate 14 may optionally be removed in areas where there are no stitches or fiber tow.

Referring now to FIGS. 4A and 4B, the fiber reinforced thermoplastic composite body panel 70 and 80 are shown, respectively. In FIG. 4A, an asymmetric design is shown. A fiber reinforced insert 74 is shown arranged along one side of the fiber reinforced thermoplastic composite body panel 70. In this example, the fiber reinforced insert 74 in a polymer layer 75 includes fiber portions 76-1, 76-2, and 76-3. In this example, one side of the fiber reinforced thermoplastic composite body panel 70 is painted. In this example, the fiber reinforced thermoplastic composite body panel 70 has a thickness $t_1+t_2$ and the fiber reinforced insert 74 has a thickness t2.

In FIG. 4B, a fiber reinforced insert 84 is arranged spaced from one side of the fiber reinforced thermoplastic composite body panel 80. Fiber portions 86-1, 86-2, and 86-3 are stitched to one side of the backing substrate 14. Fiber portions 88, 90-1, and 90-2 are stitched to an opposite side of the backing substrate 14 to form ribs. Both sides of the backing substrate 14 are fully or partially encapsulated in polymer layers 85 and 87.

In this example, one side of the fiber reinforced thermoplastic composite body panel 80 is painted or a film is applied. In this example, the fiber reinforced insert 84 includes fiber portions 86-1, 86-2, and 86-3. In this example, the fiber reinforced thermoplastic composite body panel 80 has a thickness $t_3+t_4+t_5$ and the fiber reinforced insert 84 has a thickness $t_4$. In this example, the fiber reinforced thermoplastic composite body panel 80 is spaced by a thickness $t_5$ from the one side. In some examples, the design is symmetric and $t_3=t_5$. In other examples, $t_3< >t_5$ and $t_5>0$.

In some examples, a width of the portions of the fiber reinforced insert 84 is equal to a predetermined width a. Spacing between adjacent portions of the fiber reinforced insert 84 is equal to a predetermined distance b. To prevent the fiber reinforced insert 84 from being seen through the composite panel, the thickness and spacing of the portions of the fiber reinforced insert 84 are considered. Shrinkage force F of the various portions and other parameters are calculated.

In some examples, the shrinkage force F is equal to $F_1=(\alpha_1-\alpha_2)*E_1*t_1(a+b)$ and $F_2=(\alpha_2-\alpha_1)*E_2*t_2*a$ wherein F is the shrinkage force, $\alpha$ is a coefficient of linear thermal expansion in the direction parallel to the outer surface, E is the modulus of elasticity in the direction parallel to the surface, $t_1$ is the thickness of the resin layers and $t_2$ is the thickness of the portion of the fiber reinforced insert 84. In order to have a balanced shrinkage force for a smooth surface, $F_1=F_2$. In other examples, $F_1$ and $F_2$ are within a predetermined range ($95\%*F_2 \leq F_1 \leq 105\%*F_2$) of each other.

Figure 5:
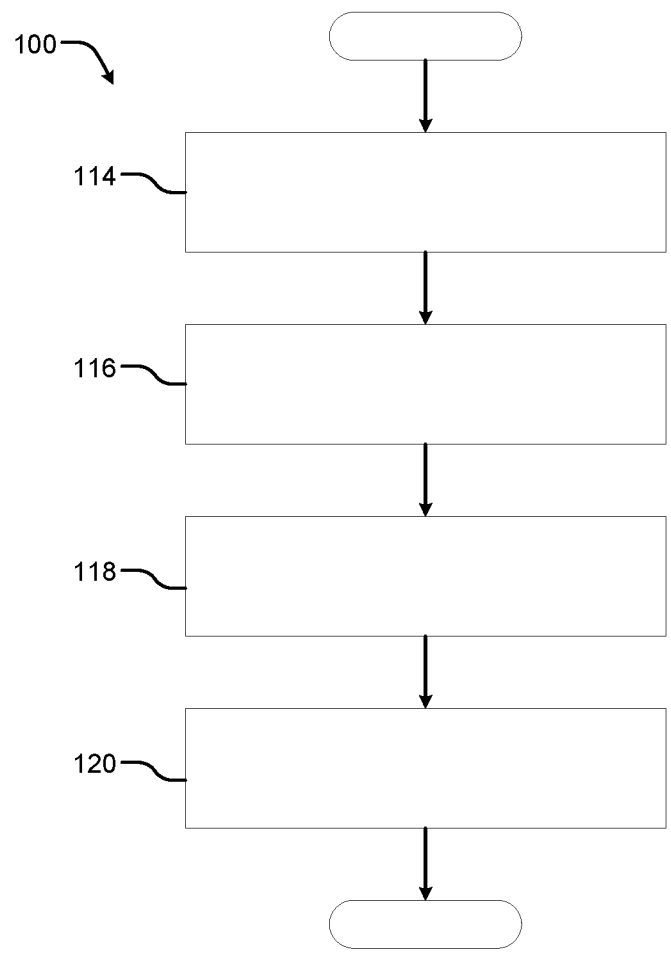
FIG. 5 is a flowchart of an example of a method for manufacturing a fiber reinforced thermoplastic composite body panel according to the present disclosure.

Referring now to FIG. 5, a method 100 for manufacturing a fiber reinforced thermoplastic composite body panel is shown. At 114, the fiber tow is stitched, woven, or embroidered onto one or both sides of the backing substrate in a predetermined pattern and in one or more layers. In the examples in FIGS. 1-4B, the fiber tow is stitched, woven, or embroidered onto one side. In FIGS. 6 to 8B, the fiber tow is stitched, woven, or embroidered onto one side to form the fiber reinforced insert and the fiber tow is stitched, woven, or embroidered onto the other side of the backing substrate to form ribs.

At 116, the fiber is optionally trimmed to refine a shape of a pattern of the fiber reinforced insert 84. The fiber tow may also be consolidated by heating the fiber tow and the backing substrate. At 118, the fiber reinforced insert is encapsulated in resin. At 120, the composite body panel is optionally painted.

Figure 6:
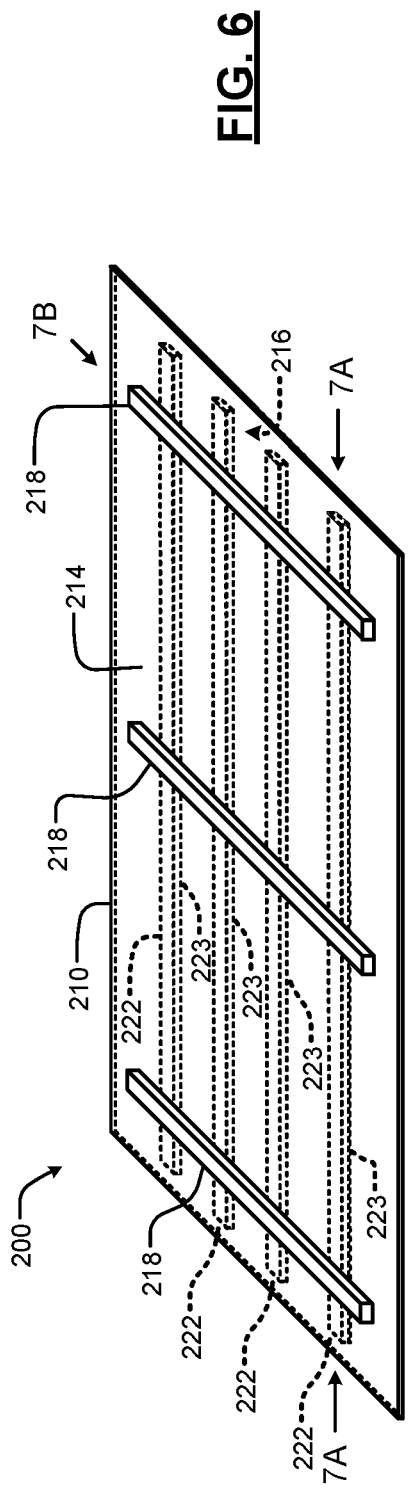
FIG. 6 is a perspective view of an example of a fiber reinforced thermoplastic composite body panel including ribs according to the present disclosure.
Figure 7B:
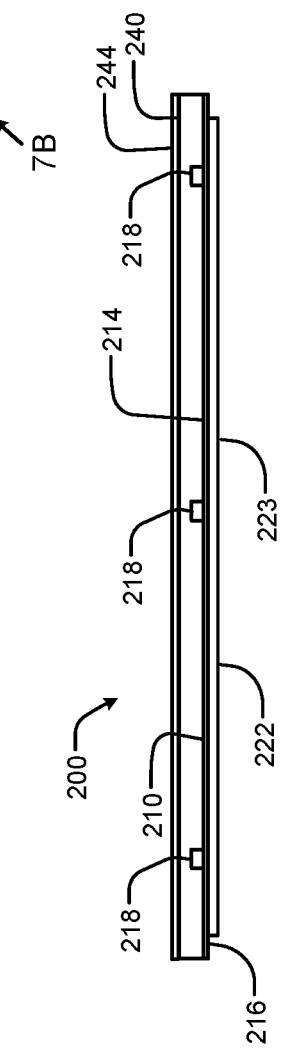
FIGS. 7A and 7B are side cross-sectional views of an example of the fiber reinforced thermoplastic composite body panel including ribs according to the present disclosure.

Referring now to FIGS. 6 to 7B, a fiber reinforced thermoplastic composite body panel 200 includes fiber tows that are placed/stitched onto both sides of the substrate. In FIG. 6, fiber tows 218 are placed/stitched on a first side 214 of a substrate 210. Fiber tows 222 defining ribs 223 are placed/stitched on a second side 216 of the substrate. The fiber tows 218 and 222 can be made of the same type of fiber tow or different types of fiber tows.

Figure 7A:
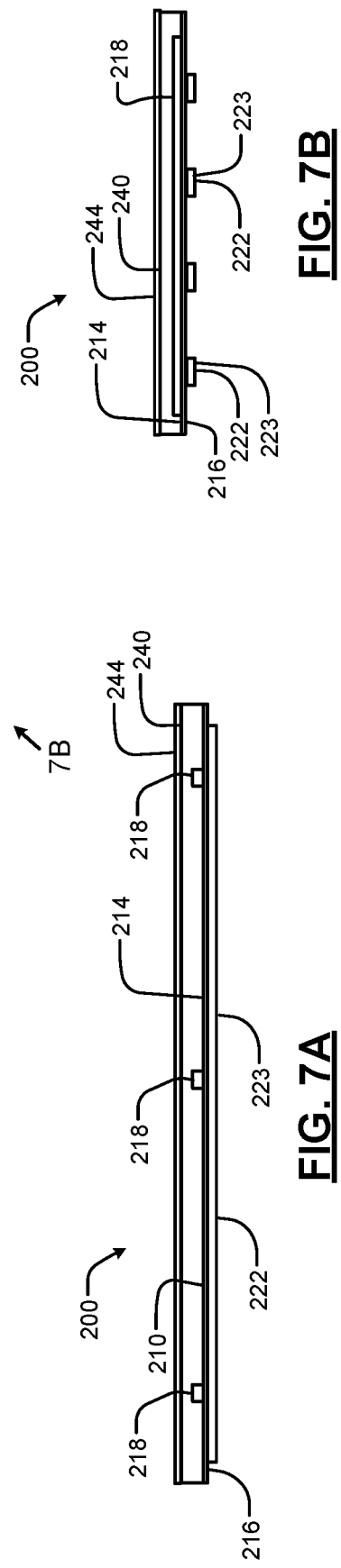

In some examples, the fiber reinforced thermoplastic composite body panel 200 is consolidated in one or more mold tools under temperature and pressure. In FIGS. 6, 7A and 7B, when placed into a first mold tool, the substrate 210 acts as a barrier so that the fiber tows 218 on the first side 214 of the substrate 210 are fully encapsulated by injection molded material 240 while the ribs on the bottom side are not encapsulated by the injection molded material 240. In some examples, a bottom portion of the injection mold tool adjacent to the fiber tows 222 is maintained at a lower temperature to minimize part distortion/warping. A layer 244 of paint or film may be added on the injection molded material 240.

Referring now to FIGS. 8A and 8B, an example of a fiber reinforced thermoplastic composite body panel 300 including ribs 320 is shown. The fiber reinforced thermoplastic composite body panel 300 includes a fiber reinforced insert (not shown). In some examples, the fiber reinforced thermoplastic composite body panel 300 corresponds to a door panel, deck lid or other component. The ribs 320 are arranged in a pattern best seen in FIG. 8A. The ribs 320 can be arranged in predetermined locations, not interconnected with other ribs and/or interconnected with other ribs, and/or form regular or irregular shapes. In some examples, the ribs 320 can be used to provide an integrated door beam to protect against side impact while minimizing packaging space.

Referring now to FIG. 9, a side cross-sectional view of an example of fiber reinforced thermoplastic composite body panel 400 includes interlocking portions 430. The backing substrate 14 includes fiber portions 410 (arranged in a predetermined pattern and stitched to one side of the backing substrate 14) forming part of a fiber reinforced insert 408. The backing substrate 14 includes ribs 420 attached to the opposite side of the backing substrate 14 extending downwardly from the fiber portions 410. The fiber portions 410 include interlocking portions 430. In some examples, the interlocking portions 430 include cavities in a side of the fiber portions 410 facing the backing substrate 14. In some examples, the interlocking portions 430 include rectangular or triangular cavities, although other shapes can be used. The backing substrate 14, the fiber portions 410, and/or some or all of the ribs 420 adjacent to the backing substrate 14 are encapsulated in polymer layers 412 and 422. The interlocking portions 430 provide additional mechanical strength to lock the fiber portions 410 and the ribs 420 in place.

In some examples, the fibers include reinforcing fibers selected from a group consisting of carbon fibers, glass fibers, basalt fibers, flax fibers, hemp fibers, and combinations thereof. In some examples, the fibers are comingled and further include polycarbonate fibers, nylon fibers, polyethylene fibers, polypropylene fibers, and combinations thereof.

In some examples, the resin is selected from a group consisting of polycarbonate, polypropylene, polycarbonate/acrylonitrile-butadiene-styrene (PC/ABS), polyphenylene oxide/polyamide (PPO/PA), polycarbonate/acrylonitrile-butadiene-styrene/polymethyl methacrylate (PC/ABS/PMMA), polyurethane, poly(aryl-ether-ketone) (PAEK), poly(ether-ketone) (PEK), poly(ether-ether-ketone) (PEEK), polyamides (PA), polyphenylene sulfide (PPS), epoxy, thermoplastic polyolefins (TPO), mineral filled resins (i.e. mineral filled polypropylene), and fiber filled resins (e.g., glass filled polypropylene, carbon fiber filled polypropylene, etc.).

Improved interaction between commingled fibers and the injection molded resin is achieved when the same polymeric structure is used in both the fiber and the injection molding resin. For example, a nylon commingled carbon fiber using a nylon injection molded resin has improved interaction.

In some examples, the paintable, fiber reinforced polymer composite has a density that is less than 1.20 g/cc, a tensile modulus greater than 5000 MPa in at least one direction, a coefficient of linear thermal expansion (CLTE) in at least one direction is less than 30 ppm/° C., a tensile strength in at least one direction is greater than or equal to 50 MPa, and a composite thickness in a range between 2 mm and 6 mm.

In some examples, the fiber tow is continuous, locally applied, and includes at least one of carbon, glass, basalt, or other fibers. In some examples, the fiber reinforcement is in the form of a dry fiber that is infused by a thermoset resin to form a structural composite. In some examples, the fiber reinforced insert is commingled with a thermoplastic fiber, consolidated into a structural insert, and over-molded with a thermoplastic resin material.

In some examples, the fiber reinforced insert is formed using a consolidation process under increased temperature and/or pressure.

In some examples, the commingled fiber is stitched to a substrate film, or backing prior to consolidation. In some examples, the fiber reinforced insert is over-molded and fully encapsulated as a centralized layer in the thickness of the structure. In other examples, the fiber reinforced insert is over-molded on one side, and an opposite side of the body panel is painted.

In some examples, the fiber reinforced insert has local, non-uniform, thickness variations.

In some examples, the fiber reinforced insert provides reinforcement that is anisotropic such that local stiffness, thermal expansion, strength, and other thermo-mechanical properties vary as a function of location within the composite body panel.

In some examples, the composite body panel is covered with a film rather than painting. In other examples, the composite body panel is not painted but is instead formed using a transparent, translucent, or semi-transparent resin material allowing light to pass through the composite body panel.

In other examples, the infusing or over-molding resin is short fiber filled, long fiber filled, mineral filled, or a combination thereof.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A composite panel, comprising:
   a backing substrate;
   a first plurality of fiber tows,
   wherein the first plurality of fiber tows is stitched to a first surface of the backing substrate in a predetermined pattern to form a fiber reinforced insert;
   a first polymer layer encapsulating the first surface of the backing substrate and the first plurality of fiber tows; and
   a second plurality of fiber tows stitched to a second surface of the backing substrate in a second predetermined pattern to form one or more ribs.

2. The composite panel of claim 1, further comprising one of:
   a paint layer on the first polymer layer; and
   a film layer arranged on the first polymer layer.

3. The composite panel of claim 1, wherein the first plurality of fiber tows includes commingled fibers including:
   first continuous fibers selected from a group consisting of carbon fibers, glass fibers, basalt fibers, and combinations thereof; and
   second continuous fibers including thermoplastic fibers.

4. The composite panel of claim 1, wherein the first plurality of fiber tows includes continuous fibers selected from a group consisting of carbon fibers, glass fibers, basalt fibers, and combinations thereof.

5. The composite panel of claim 4, wherein fibers of the first plurality of fiber tows are infused with a thermoset resin.

6. The composite panel of claim 1, wherein the composite panel is consolidated using at least one of heat and pressure prior to encapsulating the first surface of the backing substrate and the first plurality of fiber tows in the first polymer layer.

7. The composite panel of claim 1, wherein the first polymer layer is selected from a group consisting of polycarbonate, polypropylene, polycarbonate/acrylonitrile-butadiene-styrene (PC/ABS), polyphenylene oxide/polyamide (PPO/PA), polycarbonate/acrylonitrile-butadiene-styrene/polymethyl methacrylate (PC/ABS/PMMA), polyurethane, poly(aryl-ether-ketone) (PAEK), poly(ether-ketone) (PEK), poly(ether-ether-ketone) (PEEK), polyamides (PA), polyphenylene sulfide (PPS), epoxy, thermoplastic polyolefins (TPO), mineral filled resin, fiber filled resin, and combinations thereof.

8. The composite panel of claim 1, further comprising a second polymer layer encapsulating the second surface of the backing substrate and some or all of the one or more ribs.

9. The composite panel of claim 1, wherein the first plurality of fiber tows define one or more interlocking portions adjacent to the backing substrate.

10. The composite panel of claim 1, wherein:
a density the composite panel is less than 1.20 g/cc,
a tensile modulus is greater than 5000 MPa in at least one direction,
a coefficient of linear thermal expansion (CLTE) in at least one direction is less than 30 ppm/° C.,
a tensile strength in at least one direction is greater than or equal to 50 MPa, and
a thickness of the composite panel is between 2 mm and 6 mm.

11. A composite panel, comprising:
a backing substrate;
a first plurality of fiber tows,
wherein the first plurality of fiber tows is stitched to a first surface of the backing substrate in a predetermined pattern to form a fiber reinforced insert; and
a first polymer layer encapsulating the first surface of the backing substrate and the first plurality of fiber tows,
wherein the first plurality of fiber tows includes commingled fibers including:
first continuous fibers selected from a group consisting of carbon fibers, glass fibers, basalt fibers, and combinations thereof; and
second continuous fibers including thermoplastic fibers.

12. A method for manufacturing a composite panel, comprising:
providing a backing substrate;
stitching a first plurality of fiber tows to a first surface of the backing substrate in a predetermined pattern to form a fiber reinforced insert; and
encapsulating the first surface of the backing substrate and the first plurality of fiber tows in a first polymer layer; and
stitching a second plurality of fiber tows to a second surface of the backing substrate in a second predetermined pattern to form one or more ribs.

13. The method of claim 12, wherein the first plurality of fiber tows includes continuous fibers.

14. The method of claim 12, wherein the first plurality of fiber tows include:
first continuous fibers selected from a group consisting of carbon fibers, glass fibers, basalt fibers, and combinations thereof, and
second continuous fibers including thermoplastic fibers.

15. The method of claim 12, wherein fibers of the first plurality of fiber tows include continuous fibers selected from a group consisting of carbon fibers, glass fibers, basalt fibers, and combinations thereof, and wherein the fibers of the first plurality of fiber tows are infused with a thermoset resin.

16. The method of claim 12, further comprising consolidating the composite panel using at least one of heat and pressure prior to encapsulating the first surface of the backing substrate and the first plurality of fiber tows in the first polymer layer.

17. The method of claim 12, wherein the first polymer layer is selected from a group consisting of polycarbonate, polypropylene, polycarbonate/acrylonitrile-butadiene-styrene (PC/ABS), polyphenylene oxide/polyamide (PPO/PA), polycarbonate/acrylonitrile-butadiene-styrene/polymethyl methacrylate (PC/ABS/PMMA), polyurethane, poly(aryl-ether-ketone) (PAEK), poly(ether-ketone) (PEK), poly(ether-ether-ketone) (PEEK), polyamides (PA), polyphenylene sulfide (PPS), epoxy, thermoplastic polyolefins (TPO), mineral filled resin, fiber filled resin, and combinations thereof.

18. The method of claim 12, further comprising encapsulating the second surface of the backing substrate and the second plurality of fiber tows in a second polymer layer.

19. The method of claim 12, wherein:
a density of the composite panel is less than 1.20 g/cc,
a tensile modulus of the composite panel is greater than 5000 MPa in at least one direction,
a coefficient of linear thermal expansion (CLTE) of the composite panel in at least one direction is less than 30 ppm/° C.,
a tensile strength of the composite panel in at least one direction is greater than or equal to 50 MPa, and
a thickness of the composite panel is between 2 mm and 6 mm.

* * * * *